US010152993B1

(12) United States Patent
Yamamoto et al.

(10) Patent No.: US 10,152,993 B1
(45) Date of Patent: Dec. 11, 2018

(54) SAVE BLOCK DATA TO TAPE IN A REVERSE ORDER (71) Applicant: International Business Machines Corporation, Armonk, NY (US)

(72) Inventors: Noriko Yamamoto, Koto-Ku (JP); Tohru Hasegawa, Kotu-Ku (JP); Tsuyoshi Miyamura, Yokohama (JP); Shinsuke Mitsuma, Machida (JP); Sosuke Matsui, Higashimurayama (JP); Hiroshi Itagaki, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/825,158

(22) Filed: Nov. 29, 2017

(51) Int. Cl.
*G11B 5/09* (2006.01)
*G11B 5/55* (2006.01)
*G06F 17/30* (2006.01)
*G06F 3/06* (2006.01)

(52) U.S. Cl.
CPC .......... *G11B 5/5508* (2013.01); *G06F 3/0608* (2013.01); *G06F 3/0685* (2013.01); *G06F 17/30091* (2013.01); *G06F 3/061* (2013.01); *G06F 3/0643* (2013.01); *G06F 3/0682* (2013.01)

(58) Field of Classification Search
None
See application file for complete search history.

(56) References Cited

U.S. PATENT DOCUMENTS

| 5,276,830 | A  | * | 1/1994 | Endo ................. G06F 17/30952 |
| 9,348,837 | B2 |   | 5/2016 | Iwanaga |
| 2011/0188148 | A1 |   | 8/2011 | Inai |
| 2012/0179867 | A1 | * | 7/2012 | Chakravarty ........ G11B 27/107 711/111 |
| 2013/0117239 | A1 | * | 5/2013 | Hasegawa ......... G06F 17/30091 707/687 |
| 2013/0246701 | A1 |   | 9/2013 | Fujihara |

(Continued)

FOREIGN PATENT DOCUMENTS

| EP | 3026669 A1 | 6/2016 |
| JP | 5556426 B2 | 1/2012 |

(Continued)

OTHER PUBLICATIONS

"Linear Tape File System (LTFS) Format Specification", Apr. 12, 2010, LTFS Format Version 1.0, 60 pages.

(Continued)

*Primary Examiner* — Peter Vincent Agustin
(74) *Attorney, Agent, or Firm* — Andrew Aubert; David Woycechowsky (57) ABSTRACT

Linear Tape File System that can accommodate various storage orders, such as sequential and reverse sequential, on a tape medium. The storage order may be reversed (or otherwise changed) at the block level and also the bit order within the block level. The LFTS related data associated with the LFTS file system stores data sufficient to indicate storage order (for example, reverse), so that the motions of the tape medium and tape drive can be coordinated during reading or erasing operations to be performed in the correct order, with a view to the order the data was stored on the tape. Storing data in reverse order on an LFTS tape can lead to certain operational advantages.

3 Claims, 8 Drawing Sheets (56) References Cited

U.S. PATENT DOCUMENTS

| | | | |
|---|---|---|---|
| 2015/0046645 A1* | 2/2015 | Iwanaga | G06F 3/0682 |
| | | | 711/111 |
| 2015/0199132 A1 | 7/2015 | Fujihara | |
| 2016/0077757 A1* | 3/2016 | Hasegawa | G06F 3/0622 |
| | | | 711/111 |
| 2016/0124973 A1* | 5/2016 | Iwanaga | G06F 17/30076 |
| | | | 707/756 |
| 2016/0139818 A1* | 5/2016 | Hasegawa | G06F 3/065 |
| | | | 711/111 |
| 2016/0154604 A1 | 6/2016 | Hasegawa | |

FOREIGN PATENT DOCUMENTS

| | | |
|---|---|---|
| JP | 2016053895 A | 4/2016 |
| WO | PCT-2015055075 A1 | 4/2015 |

OTHER PUBLICATIONS

"Using Thunderbolt™ and LTFS with LTO™ Tape to Enhance Media Workflows", ATTO Technology Brief, 3 pages, provided in search report dated Jun. 10, 2016.

Pease et al., "The Linear Tape File System", 2010, 8 pages.

\* cited by examiner

| FILE NAME | TAPE LOCATION | LOGICAL LOCATION | FILE SIZE | DATE SAVED | DATE LAST READ | SAVE ORDER |
|---|---|---|---|---|---|---|
| RESUME1 | B1: ADDR1<br>B2: ADDR2<br>B3: ADDR3<br>B4: ADDR4 | T/RESUMES/RESUME1 | 400 | 09/02/2017<br>1 PM | 10/02/2017<br>1:37 AM | SEQUENTIAL |
| RESUME2 | B1: ADDR8<br>B2: ADDR7<br>B3: ADDR6<br>B4: ADDR5 | T/RESUMES/RESUME | 400 | 09/02/2017<br>2 PM | 10/02/2017<br>1:39 AM | REVERSE SEQUENTIAL |
| REPORT1 | B1: ADDR9<br>B2: ADDR11<br>B3: ADDR10<br>B4: ADDR12 | T/REPORT1 | 400 | 09/02/2017<br>3 PM | 10/02/2017<br>1:38 AM | ODD FIRST, THEN EVEN |

| FILE | DATA BLOCK | ATTRIBUTE | WRITE ORDER(*) | TIME OF DATA WRITTEN TO CACHE |
|---|---|---|---|---|
| File1 | 1 | ltfs.reverse=1 | 4 | 2/15/2016 10:06 |
| File1 | 2 | ltfs.reverse=1 | 3 | 2/15/2016 10:07 |
| File1 | 3 | ltfs.reverse=1 | 2 | 2/15/2016 10:08 |
| File1 | 4 | ltfs.reverse=1 | 1 | 2/15/2016 10:09 |
| ... | | | | |

(*)"WRITE ORDER" IN THE TABLE IS A WRITING ORDER IF WRITING IS PERFORMED AT THIS TIME. THE WRITING ORDER IS DETERMINED AT THE START OF WRITING.

SAVE BLOCK DATA TO TAPE IN A REVERSE ORDER

BACKGROUND

The present invention relates generally to the field of data storage using a magnetic tape medium, and more particularly to Linear Tape File System (LTFS) data storage.

The Linear Tape File System (LTFS) is a tape file system that makes it possible to use a tape in the same manner as that of a hard disk without being aware of where and in what order a write is made. Meanwhile, the LTFS is not configured to specify an order in which data blocks are written. More specifically, this means that a stored file that is made up of multiple data blocks, having a certain sequential order, can be stored such that the blocks are scattered about various non-sequential positions on the magnetic tape medium. In this way, the tape medium can be used in a space efficient manner when multiple files, each including multiple blocks, are written to the tape and/or deleted from the tape medium at various times over the operational life of the LTFS. When blocks from a single file are scattered over various physical locations on the tape medium, and a read file operation is performed, the LFTS will have the information it needs to: (i) find the relevant blocks of the file on the tape medium; and (ii) reassemble the data so that the file is provided in the proper order and includes all data of the file that is being read.

State of the art LTFS tapes are configured to include at least two partitions: (i) an index partition containing up to date and previous indexes of the data contents of a magnetic data tape, and (ii) a data partition, itself typically partitioned into a plurality of blocks, purposed for containing the data of the files stored on the magnetic data tape. Some LTFS tapes are configured to periodically store copies of the most up to date index in the data partition during data writing operations, and storing the most up to date version of the index in the index partition once data writing operations are complete.

Tape drives, including tape drives that read LTFS configured magnetic data tapes, typically can only read/write data from/to magnetic data tapes in the direction of from the first data block to the last data block. State of the art tape drives read in this sequence, sometimes called "logical forward." When a given block is to be read or written to, the tape drive seeks to the beginning of that block and starts the desired data operation, continuing until reaching the end of that block. If further blocks are to be read/written, then the operation continues onto the next block(s).

SUMMARY

According to an aspect of the present invention, there is a method, computer program product and/or system that performs the following operations (not necessarily in the following order): (i) storing, on a tape medium, a plurality of files, with each file including a plurality of data blocks having a sequential order, and with each file being stored on the tape in a stored order; (ii) for each file of the plurality of files, receiving a respective tape storage information data set, with each tape storage information data set including information including information indicative of the stored order; and (iii) generating and maintaining a Linear Tape File System (LTFS) data set that includes a plurality of records respectively corresponding to the plurality of files, with each record including a field indicative of the stored order.

DETAILED DESCRIPTION

Some embodiments of the present invention are directed to a Linear Tape File System that: (i) can accommodate various storage orders, such as sequential and reverse sequential, on a tape medium; (ii) the storage order may be reversed (or otherwise changed) at the block level and also the bit order within the block level; and (iii) the LFTS related data associated with the LFTS file system stores data sufficient to indicate storage order (for example, reverse), so that the motions of the tape medium and tape drive can be coordinated during reading or erasing operations to be performed in the correct order, with a view to the order the data was stored on the tape. In some embodiments, storing data in reverse order on an LFTS tape can lead to certain operational advantages. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
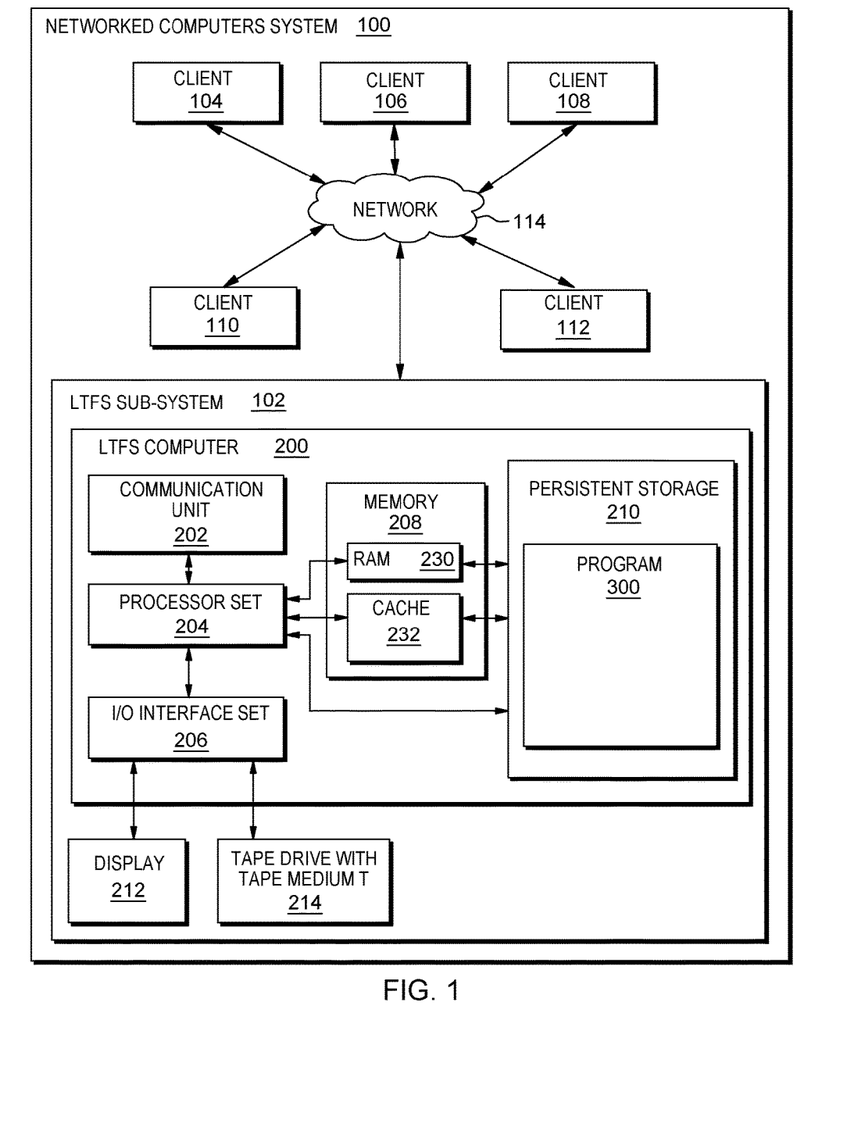
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: LTFS sub-system 102; client sub-systems 104, 106, 108, 110 and 112; communication network 114; LTFS computer 200; communication unit 202; processor set 204; input/output (I/O) interface set 206; memory device 208; persistent storage device 210; display device 212; tape drive with tape medium T 214; random access memory (RAM) devices 230; cache memory device 232; and program 300.

LTFS sub-system 102 is, in many respects, representative of the various computer sub-system(s) in the present invention. Accordingly, several portions of LTFS sub-system 102 will now be discussed in the following paragraphs.

LTFS sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

LTFS sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

LTFS sub-system 102 is shown as a block diagram with many double arrows. These double arrows (no separate reference numerals) represent a communications fabric, which provides communications between various components of LTFS sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) tape drive with tape medium T 214 may be able to supply, some or all, memory for LTFS sub-system 102; and/or (ii) devices external to LTFS sub-system 102 may be able to provide memory for LTFS sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to LTFS sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with LTFS computer 200. For example, I/O interface set 206 provides a connection to tape drive with tape medium T 214. Tape drive with tape medium T 214 will typically include devices such as a keyboard, keypad, a touch screen, and/or some other suitable input device. Tape drive with tape medium T 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
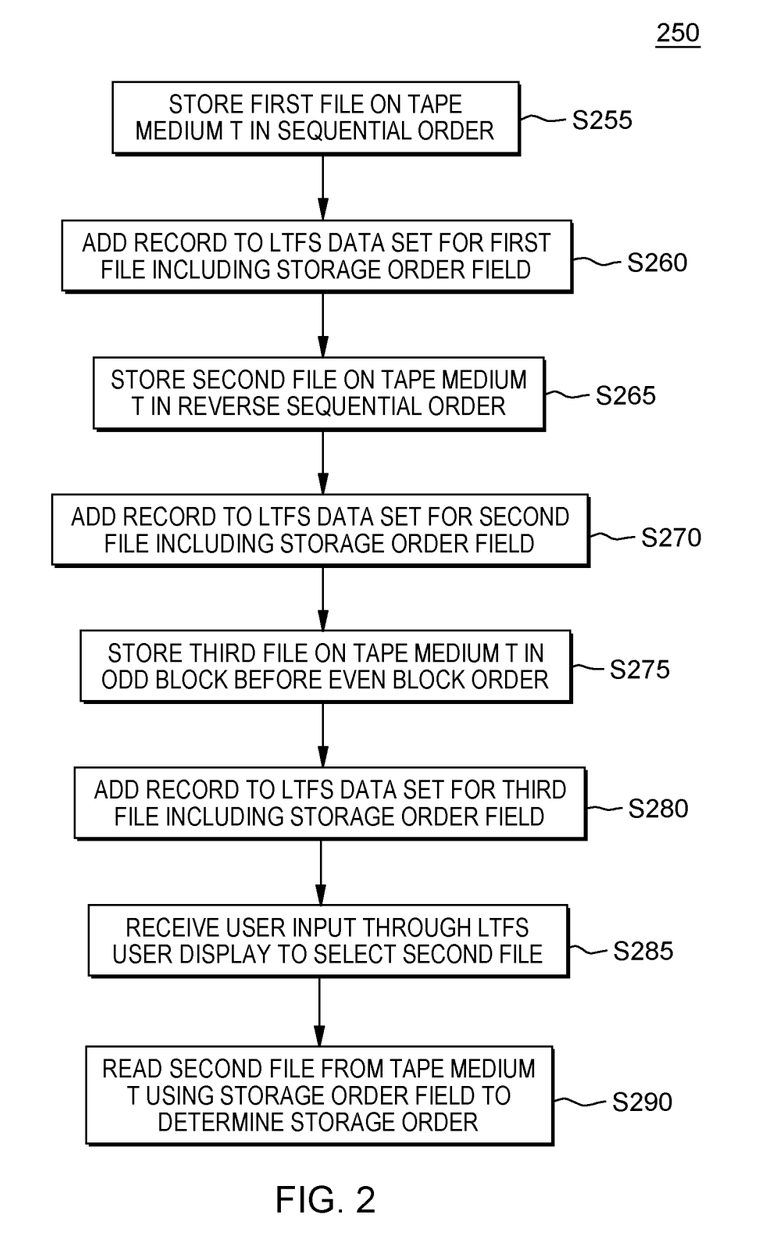
FIG. 2 is a flowchart showing a first embodiment method performed, at least in part, by the first embodiment system.
Figure 3:
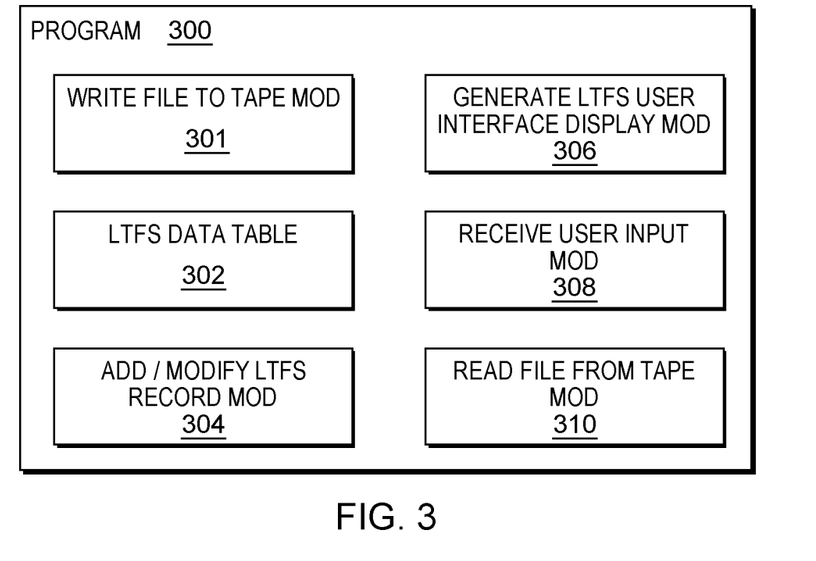
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where write file to tape module ("mod") 301 stores a first file on tape medium T in sequential order. In this example embodiment, a magnetic data tape ("tape") includes a strip of magnetic tape material subdivided length-wise into a plurality of block-spaces. Data files ("files") can be any kind of information stored in an electronic format, and are sub-divided into a plurality of blocks, based on their size, and written to the block-spaces. In this example embodiment, the term "sequential order" means that the order of the blocks of the file is the same as the order used when assembling the blocks to render the complete file.

Processing proceeds to operation S260, where add/modify LTFS record mod 304 adds a record to LFTS data table 302 (see FIG. 4A for a detailed view of this table) for the first file in LTFS data table 302, including a storage order value of "sequential" in a storage order field. More specifically, the add/modify LTFS record mod modifies LFTS data table 400a to include the following information about the first file: (i) file name (Resume1); (ii) tape location address for each block: (a) block 1 (physical tape address 1), (b) block 2 (physical tape address 2), (c) block 3 (physical tape address 3), and (d) block 4 (physical tape address 4); (iii) logical location (T/Resumes/resume1); (iv) file size (400); (v) date saved (Sep. 2, 2017 1:00 pm EST); (vi) date last read (Oct. 2, 2017 1:37 am EST); and (vii) save order (sequential). This is shown in the second row from the top of LTFS data table 400a of FIG. 4A. Processing proceeds to operation S265, where write file to tape module ("mod") 301 stores a second file on tape medium T in reverse-sequential order, sometimes called logical reverse. In this example, and as shown in table 400a of FIG. 4A, this means that: (i) the first sequential order block of the second file is written at physical tape address 8; (ii) the second sequential order block of the second file is written at physical tape address 7; (iii) the third sequential order block of the second file is written at physical tape address 6; and (iv) the fourth sequential order block of the second file is written at physical tape address 4. In this way, when the tape medium T is moving in the reverse direction with respect to the tape head, then the blocks will be read in sequential order. As further discussed in the following sub-section of this Detailed Description section, this can lead to certain operational advantages.

Figure 4A:
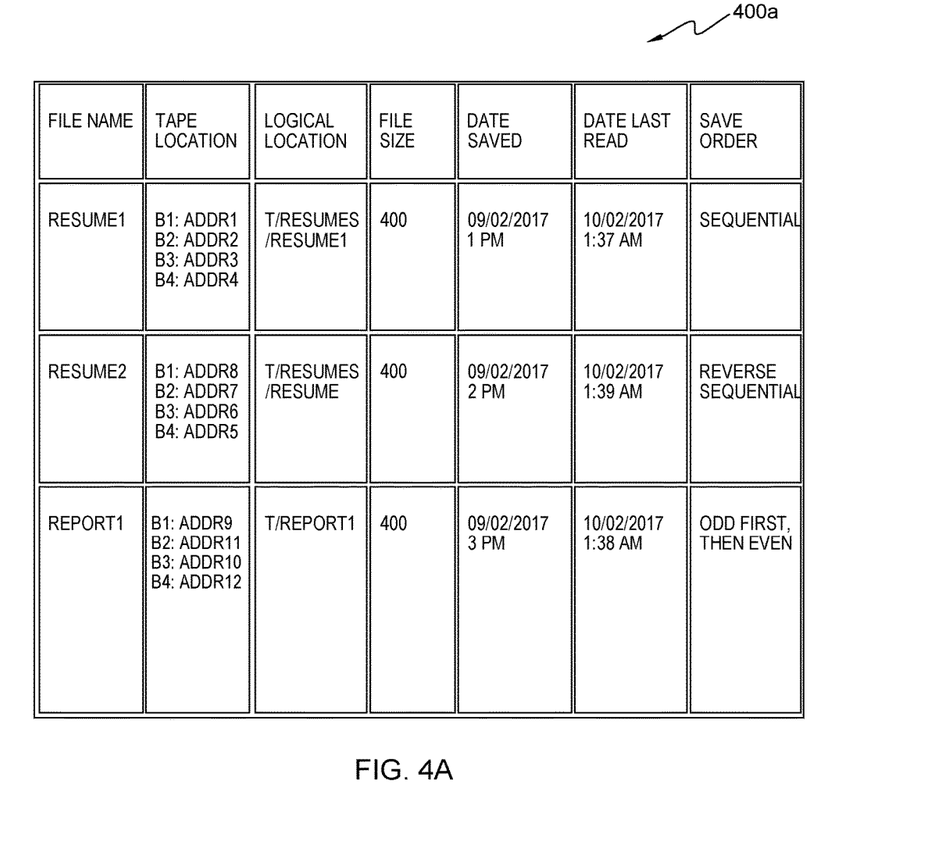
FIG. 4A is an LFTS data table generated by the first embodiment system.

In this embodiment, each reverse sequential order block has the data within the block written in reverse order. For example, the data of the first block of the second file is: 000111. This means that the data starting at physical tape location 8, and moving forward along the forward direction of tape medium T will be: 111000. This way, when tape medium T is moving in the reverse direction with respect to the tape head, the data of this block will be read as 000111. Alternatively, in some embodiments, the blocks may be written in reverse order at the block level, even though the data within the block is written in forward order. In some embodiments, the LFTS table may have separate fields for indicating: (i) block level order; and (ii) order of the data within a single block.

Processing proceeds to operation S270, where add/modify LTFS record mod 304 adds a record to LTFS data table 302, including a storage order in a storage order field. In this example embodiment, this storage order field indicates the reverse order that was used at operation S265. This is shown in the second row from the bottom of LTFS data table 400a of FIG. 4A.

Processing proceeds to operation S275, where write file to tape module ("mod") 301 stores a third file on tape medium T in the following order: (i) first all odd numbered blocks (in sequential order); and (ii) then all even numbered blocks (which are also in sequential order). In this example embodiment: (i) the data within each odd block is stored in forward reading order; and (ii) the data within each even block is stored in reverse order. This particular format may not be a particularly efficient way to store a file in an LFTS system, but this example is intended to show broad potential scope of the potential invention. More specifically, by indicating block level order and/or bit level order within an LFTS table, greater flexibility is obtained with respect to the possible ways that data may be stored on and/or read from an LFTS tape medium.

Processing proceeds to operation S280, where add/modify LTFS record mod 304 adds a record to the LTFS data set for the third file in LTFS data table 302 (see FIG. 4A), including a storage order in a storage order field indicating the odd block before even block order.

Figure 4B:
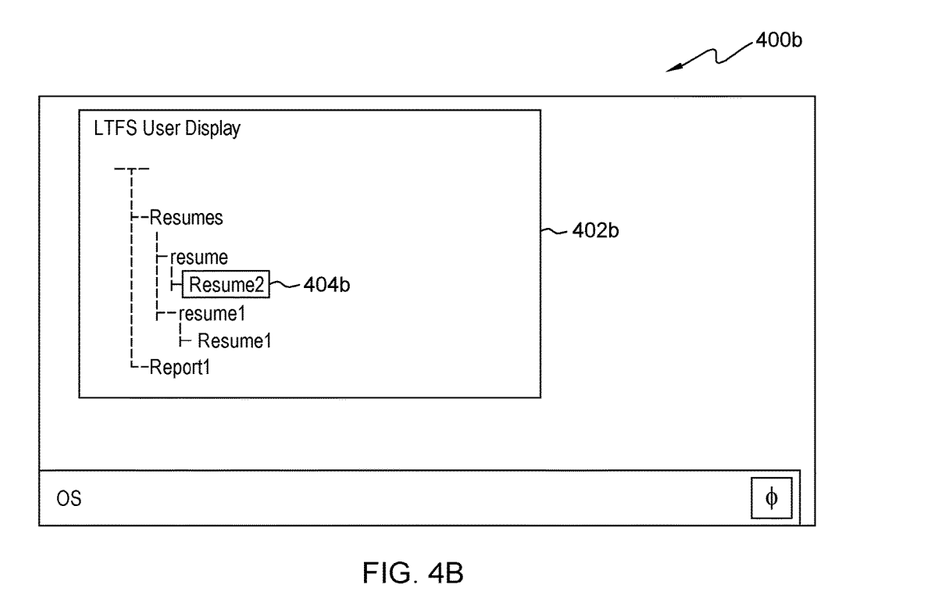
FIG. 4B is a screenshot view of a user interface generated by the first embodiment system.

Processing proceeds to operation S285, where: (i) generate LTFS user interface display mod 306 displays an LTFS user interface displaying LTFS data contents of tape medium T; and (ii) receive user input mod 308 receives user input through the LTFS user display indicating selection of the second file. In this example embodiment, LTFS user display mod 306 displays an LTFS user display shown as LTFS user display 402b of screenshot 400b of FIG. 4B. Also shown in FIG. 4B is cursor 404b selecting the second file, Resume2, within the LTFS file system of tape medium T. In this example embodiment, user input is received in the form of a cursor type selection from a computer mouse input device. Other input devices may be used to indicate user input, such as computer keyboards, touchscreens, microphones, or any other type of computer interface device.

Processing proceeds to operation S290, where read file from tape mod 310 reads a second file from tape medium T using the storage order field to determine storage order. In this example embodiment, read file from tape mod 310, having received user input indicating a selection of the second file at the previous operation step, looks up the record for the second file in the LTFS data set. The read file from tape mod determines from the LTFS data set that the blocks of the second file are located at the addresses 5-8 on tape medium T and the save order for the second file is reverse sequential. The second file is read from addresses 5-8 and the read file from tape mod composes the file one block at a time by reading blocks 4, 3, 2, 1 in that order from addresses 5, 6, 7 and 8. After this is completed, the complete second file is retrieved from the address space of tape medium T and is displayed to the user in an LTFS user interface.

III. Further Comments and/or Embodiments

Some embodiments of the present invention recognize the following facts, potential problems and/or potential areas for improvement with respect to the current state of the art: (i) in a magnetic tape to which data are written in LTO format, it is impossible to read the data in a direction reverse to the writing direction; (ii) data searching is performed from the newest data to the oldest data in one file, to read the data in order from the finally-written data (the newest data); (iii) the data are read in order of Read 1 and Read 2 in FIG. 5; (iv) the head of a tape drive moves a long distance on the tape, which increases the time necessary for reading; (v) to change the writing order of a file, the file may be written in a disk once, and then the file may be copied to the LTFS, however, an application therefor is necessary; and/or (vi) copying the file between tapes later makes it possible to change the order of data, however, an application therefor is also necessary, and two tape drives are occupied, which applies a load to the system.

Some embodiments of the present invention recognize the following facts, potential problems and/or potential areas for improvement with respect to the current state of the art: (i) an issue occurs in the case where it is known that information to be read earlier is located in newer data, for example, in search for the information from data accumulated with time or from monitoring camera images (note FIG. 5, discussed in greater detail below, illustrates a small number of blocks for simplicity, however, it is assumed in practice that the head of the tape drive moves back through several tens or more blocks in reading in order from the oldest); (ii) the term LTFS as used herein specifically refers to LTFS SDE (Single Drive Edition); and/or (iii) this proposal aims at making it possible for a user to change the way of writing the file data to the tape solely relying upon a file system without use of an application.

Figure 5:
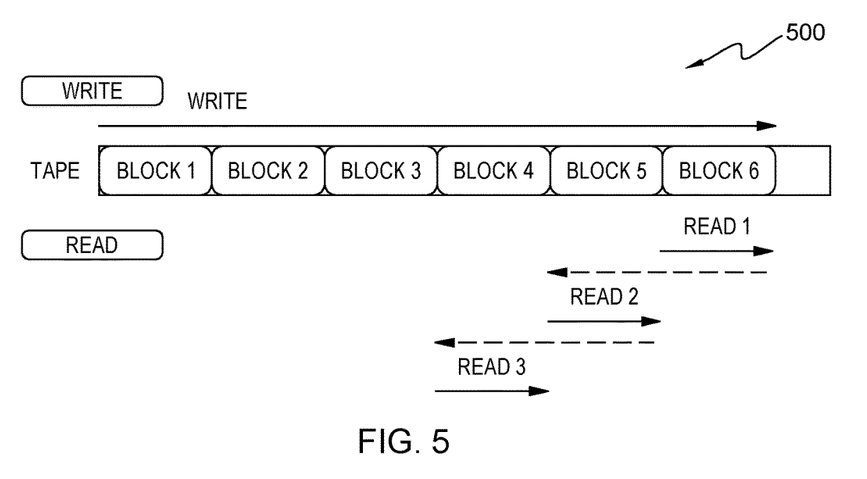
FIG. 5 is a block diagram showing a read/write operation on a magnetic tape data storage tape of an embodiment of a method according to the present invention.

Diagram 500 of FIG. 5 shows how state of the art LTFS systems operate when attempting to read first the most recently written data from the end of a tape medium. As shown in FIG. 5, Block 1 is written first, then Block 2, Block 3, Block 4, Block 5, and finally Block 6. State of the art LTFS systems, upon attempting to read the three most recently written blocks (Block 6, Block 5 and Block 4) first, would seek all the way from the beginning of Block 1 to the end of Block 5, and then read Block 6 from beginning to end. Upon reaching the end of Block 6, the state of the art LTFS system would seek back across the breadth of Block 6 and Block 5 until reaching the beginning of Block 5, then reads Block 5 from beginning until end. Next, the state of the art LTFS system seeks back across the breadth of Block 5 and Block 4 until reaching the beginning of Block 4, then reads Block 4 from beginning until end.

Some embodiments of the present invention may include one, or more, of the following features, characteristics and/or advantages: (i) a method of writing a file data into a tape in order reverse to a writing order of the file data to a file system; (ii) a user specifies that the data are to be written in reverse order by setting the attribute of the file; (iii) before the file data are written to the tape, the file system divides the file into a plurality of data blocks and stores the data blocks in the cache temporarily; (iv) the order of data block of each file and the time at which the data block is written are managed by a table in the file system; (v) for the files which have been already closed at the time when the sync command of the file system is executed, the data are written from the cache to the tape in the reverse order; and/or (vi) the change of the writing order of the file data to the tape is achieved by a file system in response to an instruction from a user without use of an application.

Some embodiments of the present invention may include one, or more, of the following features, characteristics and/or advantages: (i) LTFS is assumed to be LTFS SDE; (ii) the size of an LTFS cache in which the file data are stored before writing to the tape, is set to LTFS; (iii) default value is automatically set after the tape is loaded, and the value may be changed; (iv) to avoid division of the file, the size of the cache is set to an estimated maximum size of the file; and/or (v) Write Data of File in Reverse Order.

Figure 6:
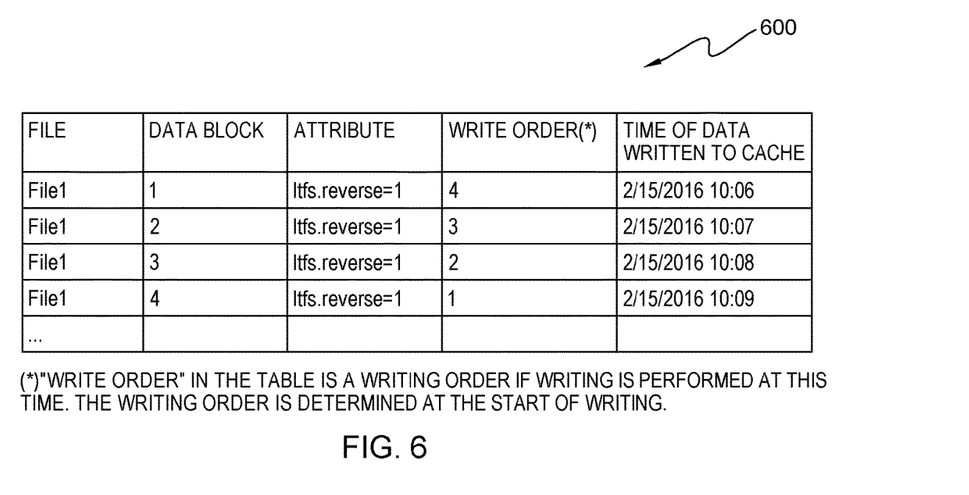
FIG. 6 is a table showing attributes for data blocks in a file system according to an embodiment of a method according to the present invention.

Some embodiments of the present invention may include one, or more, of the following features, characteristics and/or advantages: (i) a file is started to be written in the LTFS by an application or in response to an instruction from a user (File Open); (ii) to specify writing the file data to a tape in an order reverse to the writing order, an extended attribute of "lifs.reverse=1" is set to the file, as shown in table 600 of FIG. 6; (iii) after the file is written to the file system by the application or in response to the instruction from the user, the LTFS divides the file data into block units (512 KB) of the LTFS, and stores the divided file data in the LTFS cache; (iv) a table indicating correspondence between the respective block numbers, reception time of a writing request, and Attribute is prepared (see FIG. 6); (v) as for the file that has been set with "lifs.reverse=1" and closed at the timing when "sync" of the file system is executed in response to a sync command, the blocks of the file are arranged in reverse order and written to a tape; (vi) the file system sync is performed by a predetermined trigger such as the lapse of a predetermined time, unmounting a tape, or a request by a command; (vii) LTFS stores data and LTFS Index on the physical tape on sync; and/or (viii) "ltfs.reverse" is written as "Attribute" of the file in "LTFS Index" so that the data written in reverse order can be recognized in reading.

Figure 7:
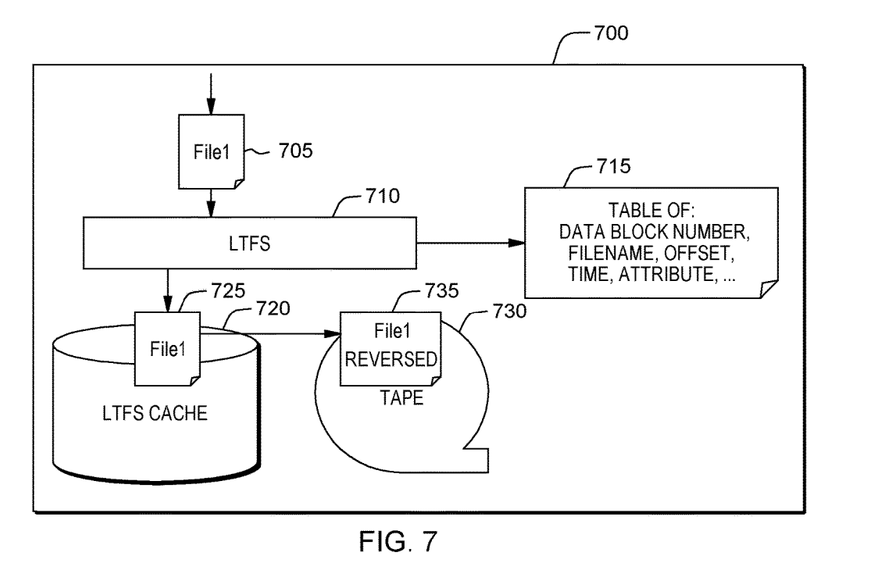
FIG. 7 is a block diagram of a second embodiment of a system according to the present invention.

LTFS system 700 of FIG. 7 shows an embodiment of the present invention and includes: (i) data file File1 705; (ii) LTFS program 710; (iii) LTFS index table 715; (iv) LTFS Cache 720; (v) cached copy 725 of data file File1; (vi) LTFS tape 730; and (vii) reverse LTFS tape stored data file File1 735. Data file File1 705 is a data file to be stored on an LTFS tape system in a reverse write order consistent with an embodiment of the present invention. LTFS program 710 is a software and/or firmware controller for LTFS data storage applications. LTFS index table 715 is an index of data files and their properties and attributes (including Attribute such as ltfs.reverse=1) stored on LTFS tape 730. LTFS cache 720 is a cache of memory used by LTFS program 710 to facilitate data storage operations between LTFS tape 730 and a computer system (not shown). Cached copy 725 of data file File1 is a copy of data file File1 705 stored in cache 720 prior to being written to LTFS tape 730. LTFS tape 730 is a magnetic tape storage device for storing data files (such as data file File1 705) including a tape medium (not shown). Reverse LTFS tape stored data file File1 735 is a copy of cached copy 725 written in reverse write order consistent with an embodiment of the present invention.

Some embodiments of the present invention may include one, or more, of the following features, characteristics and/or advantages: (i) an alternative method is conceivable in which parameters similar to "Attribute" are set in an extension of the file or a directory name; (ii) another alternative using IOCTL function in place of "Set attr", the IOCTL function is executed by the application in response to ioctl system call on a Linux system; (iii) the ioctl system call may be read from a user process, and may be used to change and read the device setting; (iv) action similar to the action by the ioctl system call may be executed by a function of "DeviceIoControl( )" also on a Windows system; and/or (v) a control function called by the defined constant for the ioctl command is prepared in the LTFS.

A method according to one embodiment of the present invention includes the following steps: (i) writing a file to a tape in a storage system including a cache and the tape, the file being managed by a file system; (ii) setting, as an extended attribute of the file, an attribute indicating that data blocks are to be written in a reverse order; (iii) dividing the file into a plurality of data blocks, the plurality of data blocks having an original writing order to the tape; (iv) writing the file into the cache; (v) determining that the plurality of data blocks are written in an order reverse to the original writing order to the tape, based on the attribute attached to the file, the attribute indicating that the data are to be written in the reverse order; and (vi) sequentially writing the plurality of data blocks to the tape in the determined reverse order.

The method of the preceding paragraph may include one or more of the following features: (i) an index of the file system includes, as the attribute of the file, the attribute indicating that the data have been written in the reverse order so that the plurality of blocks written in the reverse order can be recognized in reading; and/or (ii) the plurality of blocks are sequentially written to the tape in response to start of writing (sync) of an updated index to the end of the data partition and to the index partition of the file system.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Logical reverse: magnetic tape data read/write operations performed in the direction of from the last data block to the first data block on a tape medium.

What is claimed is:

1. A method comprising:
    storing, on a tape medium, a plurality of files, with each file including a plurality of data blocks having a sequential order, and with each file being stored on the tape in a stored order;
    for each file of the plurality of files, receiving a respective tape storage information data set, with each tape storage information data set including information including information indicative of the stored order; and
    generating and maintaining a Linear Tape File System (LTFS) data set that includes a plurality of records respectively corresponding to the plurality of files, with each record including a field indicative of the stored order;
    wherein the plurality of files includes a first file that has a stored order that is reverse of the sequential order.

2. A computer program product comprising:
    a machine readable storage device; and
    computer code stored on the machine readable storage device, with the computer code including instructions for causing a processor(s) set to perform operations including the following:
        storing, on a tape medium, a plurality of files, with each file including a plurality of data blocks having a sequential order, and with each file being stored on the tape in a stored order,
        for each file of the plurality of files, receiving a respective tape storage information data set, with each tape storage information data set including information including information indicative of the stored order, and
        generating and maintaining a Linear Tape File System (LTFS) data set that includes a plurality of records respectively corresponding to the plurality of files, with each record including a field indicative of the stored order;
    wherein the plurality of files includes a first file that has a stored order that is reverse of the sequential order.

3. A computer system comprising:
    a processor(s) set;
    a machine readable storage device; and
    computer code stored on the machine readable storage device, with the computer code including instructions for causing the processor(s) set to perform operations including the following:
        storing, on a tape medium, a plurality of files, with each file including a plurality of data blocks having a sequential order, and with each file being stored on the tape in a stored order,
        for each file of the plurality of files, receiving a respective tape storage information data set, with each tape storage information data set including information including information indicative of the stored order, and
        generating and maintaining Linear Tape File System (LTFS) data set that includes a plurality of records respectively corresponding to the plurality of files, with each record including a field indicative of the stored order;
    wherein the plurality of files includes a first file that has a stored order that is reverse of the sequential order.

* * * * *